US009989650B2

(12) United States Patent
Phuyal et al.

(10) Patent No.: US 9,989,650 B2
(45) Date of Patent: Jun. 5, 2018

(54) POSITION IN URBAN CANYONS

(71) Applicant: Navteq B.V., Veldhoven (NL)

(72) Inventors: Bishnu Phuyal, Mount Prospect, IL (US); Jeffrey R. Bach, Aurora, IL (US); Narayanan Alwar, South Barringon, IL (US)

(73) Assignee: HERE Global B.V., Eindhoven (NL)

( * ) Notice: Subject to any disclaimer, the term of this patent is extended or adjusted under 35 U.S.C. 154(b) by 1192 days.

(21) Appl. No.: 13/766,225

(22) Filed: Feb. 13, 2013

(65) Prior Publication Data
US 2014/0225771 A1 Aug. 14, 2014

(51) Int. Cl.
*G01S 19/45* (2010.01)
*G01S 17/02* (2006.01)
(Continued)

(52) U.S. Cl.
CPC ............. *G01S 19/45* (2013.01); *G01S 5/16* (2013.01); *G01S 17/023* (2013.01); *G01S 17/46* (2013.01); *G01S 19/22* (2013.01); *G01S 19/48* (2013.01)

(58) Field of Classification Search
CPC ........ G01S 5/16; G01S 5/0252; G01S 17/023; G01S 17/46; G01S 17/48; G01S 19/22;
(Continued)

(56) References Cited

U.S. PATENT DOCUMENTS

2002/0050944 A1\* 5/2002 Sheynblat ............... G01S 19/22
342/357.25
2005/0033510 A1\* 2/2005 Kawaguchi ........ G01C 21/3415
701/533
(Continued)

FOREIGN PATENT DOCUMENTS

DE 102009052560 5/2011
DE 102011119762 6/2012
(Continued)

OTHER PUBLICATIONS

J. Leonard et al., A Perception-Driven Autonomous Urban Vehicle, in The DARPA Urban Challenge: Autonomous Vehicles in City Traffic, Springer Tracts in Advanced Robotics, p. 163-230, 2009.\*
(Continued)

*Primary Examiner* — Bernarr E Gregory
*Assistant Examiner* — Fred H Mull
(74) *Attorney, Agent, or Firm* — Lempia Summerfield Katz LLC

(57) ABSTRACT

In one embodiment, the position of a mobile device is determined based, at least on part, of the relative locations of two or more nearby points. Distance data, received from a range finding sensor, corresponds to distances to the two or more nearby points from the mobile device. A predetermined model that includes previously recorded locations for objects is accessed to receive location data for two or more nearby points. A position of the mobile device is calculated based on the location data and the distance data. The nearby points may be building edges or building corners. The calculation may involve a series of equations. The series of equations may include satellite-based positioning equations in addition to equations based on the predetermined model.

11 Claims, 11 Drawing Sheets

(51) Int. Cl.
*G01S 19/48* (2010.01)
*G01S 17/46* (2006.01)
*G01S 19/22* (2010.01)
*G01S 5/16* (2006.01)

(58) Field of Classification Search
CPC .......... G01S 19/24; G01S 19/45; G01S 19/48; G01S 7/4813; G01C 21/3415; G06K 9/00637; G06T 7/05
See application file for complete search history.

(56) References Cited

U.S. PATENT DOCUMENTS

| | | | |
|---|---|---|---|
| 2008/0033645 A1* | 2/2008 | Levinson | G01S 5/0252 701/469 |
| 2008/0167814 A1* | 7/2008 | Samarasekera | G01C 21/005 701/469 |
| 2009/0228157 A1 | 9/2009 | Breed | |
| 2010/0150431 A1* | 6/2010 | Chen | G06K 9/00637 382/154 |
| 2011/0054791 A1 | 3/2011 | Surampudi et al. | |
| 2011/0216304 A1* | 9/2011 | Hall | G01S 7/4813 356/4.01 |
| 2012/0101681 A1 | 4/2012 | Wagner et al. | |
| 2012/0127030 A1* | 5/2012 | Arthur | G01S 19/45 342/357.28 |
| 2013/0261921 A1 | 10/2013 | Bando et al. | |
| 2014/0141803 A1* | 5/2014 | Marti | G01S 5/0252 455/456.2 |
| 2015/0227775 A1* | 8/2015 | Lewis | G06T 17/05 345/419 |

FOREIGN PATENT DOCUMENTS

| | | |
|---|---|---|
| EP | 2657920 | 10/2013 |
| WO | WO2009118043 | 10/2009 |
| WO | WO2012086401 | 6/2012 |

OTHER PUBLICATIONS

Aboelmagd Noureldin et al., "Fundamentals of Inertial Navigation, Satellite-Based Positioning and Their Integration", accessed Jan. 28, 2013.

Bin Gao et al., "Vehicle Identification and GPS Error Detection from a LIDAR Equipped Probe Vehicle", The Ohio State University, Columbus, Ohio, 2006.

Claus Brenner, "Vehicle Localization Using Landmarks Obtained by a LIDAR Mobile Mapping System", Leibniz Universitat Hannover, vol. XXXVIII, Part 3A, Sep. 1-3, 2010.

Sohel Syed et al., "Semi-Automatic 3D Building Model Generation from Lidar and High Resolution Imagery", Airborne Research Australia, Flinders University, Sep. 2005.

Edmund Arpin V et al., "A High Accuracy Vehicle Positioning System Implemented in a Lane Assistance System when GPS is Unavailable", Department of Mechanical Engineering, University of Minnesota, Jul. 2011.

Andrey Soloviev, Backing up GNSS with Laser Radar & INS, RAIM in the city, Antenna Phase Wind-up, Aug. 1, 2007, pp. 26-35, Inside GNSS.

International Search Report and Written Opinion cited in Application No. PCT/EP2014/052381, dated May 15, 2014.

Office Action in European Patent Application No. 14703814.5, dated Jan. 29, 2018, 4 pages.

* cited by examiner

POSITION IN URBAN CANYONS

FIELD

The following disclosure relates to determining a user position in urban canyons or other occluded areas.

BACKGROUND

A canyon is a deep ravine or gorge between land masses or cliffs. A canyon is often carved out by a river that flows in the bottom of the canyon. A similar geographic feature occurs in urban areas as skyscrapers or other buildings imitate cliffs with the streets below running like rivers. These man made topographies are referred to as urban canyons. Urban canyons have been studied for the effects on temperature, wind, and air quality.

In addition, urban canyons may influence radio communication. The propagation of radio waves may be affected by urban canyons. Radio waves may be blocked by buildings. Radio waves may be reflected off buildings and diffracted around buildings, following different paths to the same destination. Thus, delays or artifacts may be introduced in radio communication signals by the urban canyon.

The global positioning system (GPS) and other satellite-based positioning systems are susceptible to delays in radio communication signals. The positioning system receiver receives communication signals and determines the distance to the satellites sending the communication signals based on the speed of the communication signals and the time the communication signals were transmitted. Satellite-based positioning systems become unreliable in urban canyons because communication signals may be blocked or delayed. The delayed signal path of the GPS is due to signal reflections and is termed GPS multi-path.

SUMMARY

In one embodiment, the position of a mobile device is determined based, at least on part, of the relative locations of two or more nearby points. Distance data, received from a range finding sensor, corresponds to distances to the two or more nearby points from the mobile device. A predetermined model that includes previously recorded locations for objects is accessed to receive location data for two or more nearby points. A position of the mobile device is calculated based on the location data and the distance data. The nearby points may be building edges or building corners. The calculation may involve a series of equations. The series of equations may include satellite-based positioning equations in addition to equations based on the predetermined model.

BRIEF DESCRIPTION OF THE DRAWINGS

Exemplary embodiments of the present invention are described herein with reference to the following drawings.

DETAILED DESCRIPTION

GPS and other satellite-based positioning systems suffer accuracy problems from either lack of positioning capability due to reduced number of visible satellite or the multipath reflections due to urban canyons or other areas where the sky is partially occluded. The following embodiments use distances measured to building corners or edges using a range finding device (e.g., a light detection and ranging (LIDAR) sensor or another optical sensor) and stored coordinates of the building corners to calculate user position. The technique may be employed at all times or when GPS readings are inaccurate or not available. The coordinates of the building corners are obtained from a building model or a map database. The calculated position may be the position of a mobile device and/or vehicle. Therefore by solving positioning in urban canyons, a seamless positioning can be achieved everywhere in outdoor environment.

Figure 1:
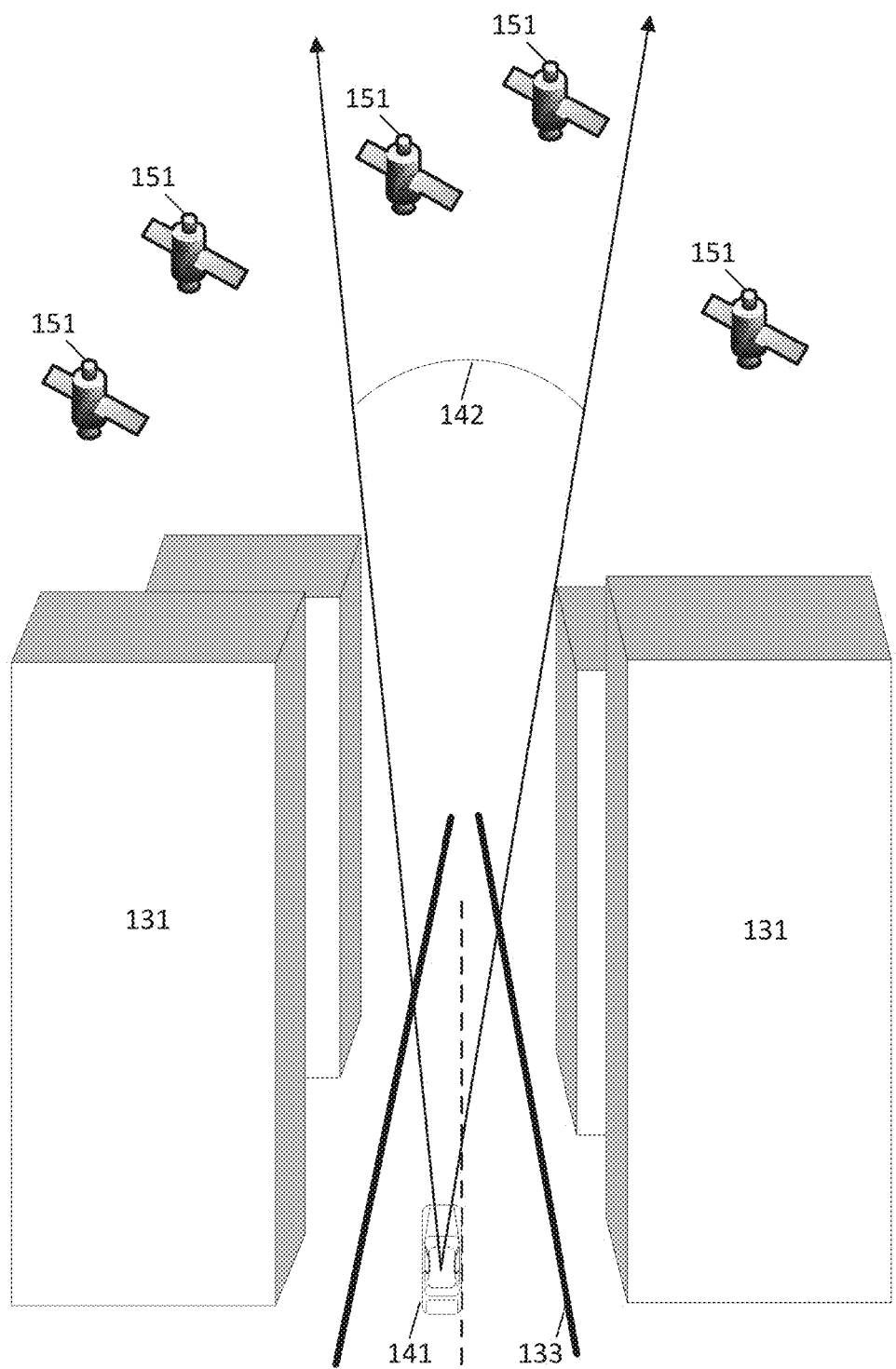
FIG. 1 illustrates an example of an urban canyon.

FIG. 1 illustrates an urban canyon between buildings 131. A vehicle 141 traveling along road 133 includes a satellite-based positioning unit configured to communicate with satellites 151. The satellite-based positioning unit may experience inaccuracies because of the urban canyon. For example, the buildings 131 limit the field of view 142 of the satellite-based positioning unit to the sky and satellites 151. As a result, the number of satellites directly accessible is reduced. The example of FIG. 1 illustrates two of the possible five satellites 151 are in range of the satellite-based positioning unit in the vehicle 141. Any number of satellites may be in the sky above a user horizon at any time and any number of the satellites may be blocked by the urban canyon in a location.

Figure 2:
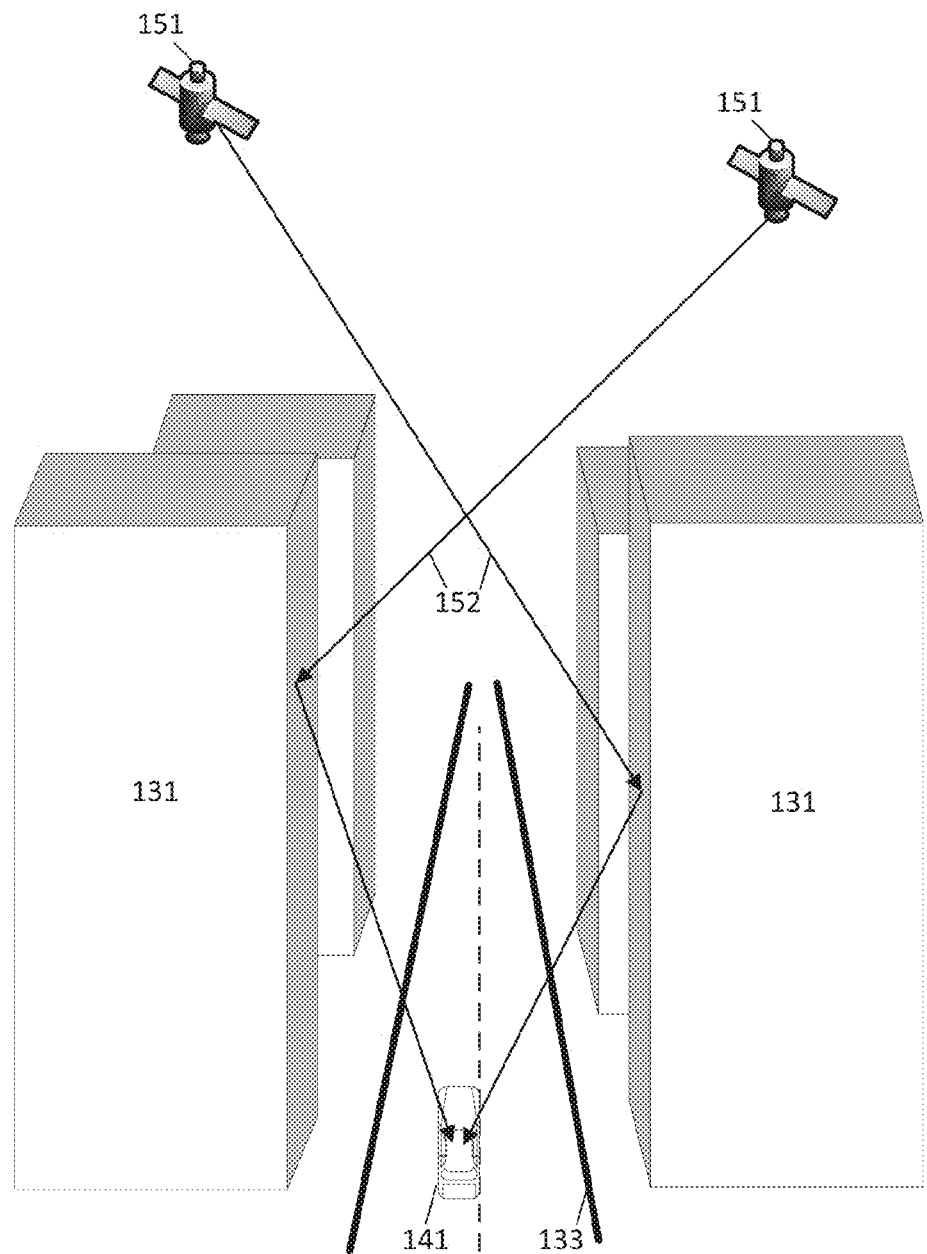
FIG. 2 illustrates another example of an urban canyon.

FIG. 2 illustrates another example of an urban canyon. The urban canyon illustrates the multipath phenomenon, which occurs when radio signals from satellites 151 follow an indirect or longer path to the satellite-based positioning unit. For example, as shown in FIG. 2, radio signals 152 may be reflected by buildings 131 and travel a longer path to the satellite-based positioning unit in vehicle 141 traveling on the street 133. In addition, multipath is caused when radio signals from a satellite 151 follow reflected path to the satellite-based positioning unit. Multipath may cause phase shifting, constructive interference or destructive interference, any of which degrade the radio signal strength also.

Satellite-based positioning systems are particularly susceptible to multipath. The satellite-based positioning unit calculates how far away the satellite is based on the radio signal received at the user receiver. The position of the satellite-based positioning unit is calculated from distances to multiple satellites. If the radio signal requires more time to reach the satellite-based positioning unit because the radio signal is reflected off a building or another object, the satellite-based positioning unit incorrectly uses the longer distance than the straight path to the satellite. Thus, the satellite-based positioning unit calculates an inaccurate position.

The following embodiments calculate position in urban canyons even when satellites are blocked in line of sight by buildings or radio signals suffer from multipath errors due to reflection from buildings. The satellite-based positioning system is supplemented using a stored position of a building corner or other object and a distance measurement to the building or object. The stored position of the building or object may be derived from a building model or footprint.

Figure 3:
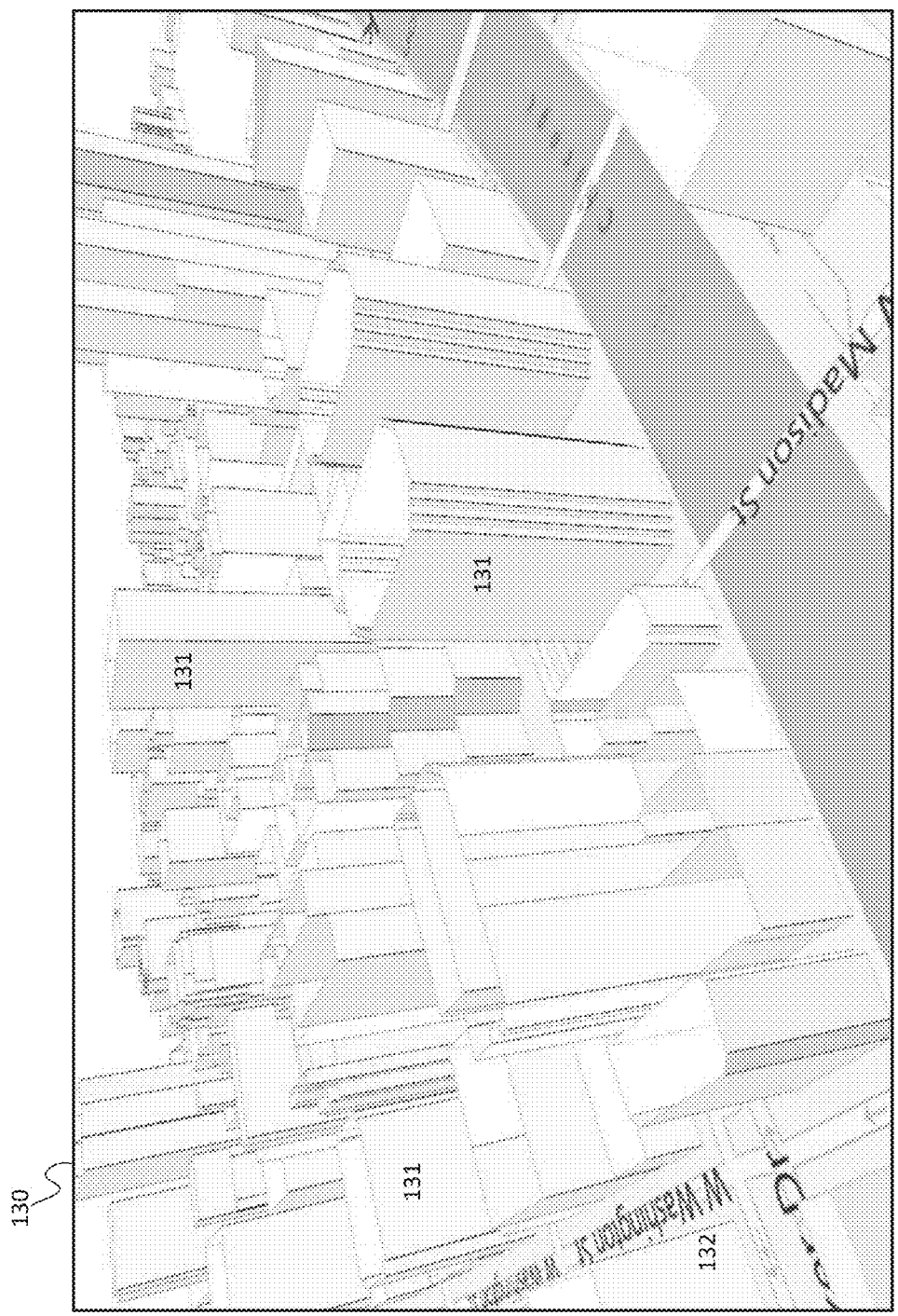
FIG. 3 illustrates a graphical representation of a building model.
Figure 4:
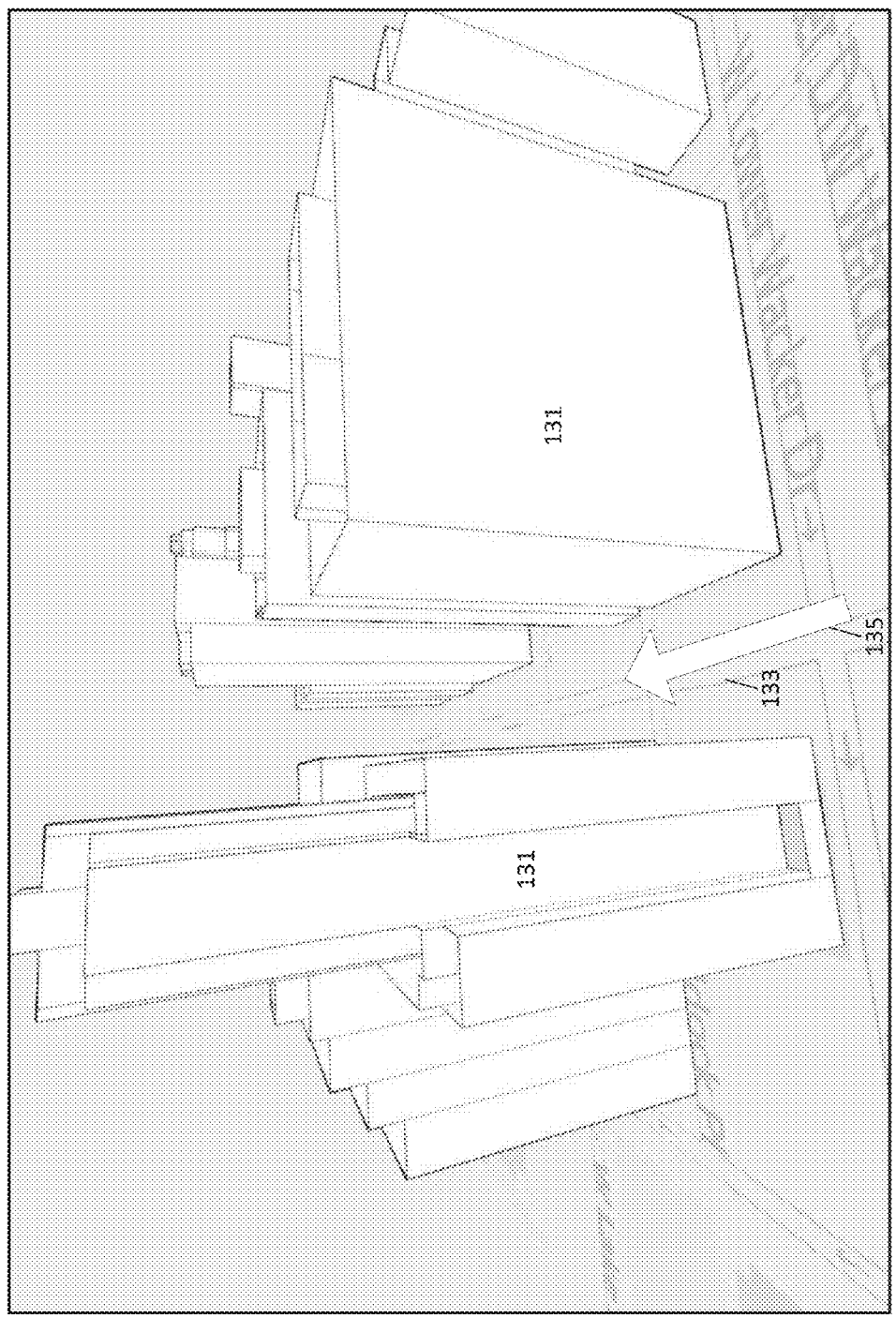
FIG. 4 illustrates an example portion of the graphical representation of the building model of FIG. 3.

FIG. 3 illustrates a graphical representation of a building model. The building model may be a three-dimensional building model 130, as shown in FIG. 3, or may be a two-dimensional building model. The two-dimensional building model may be referred to as a building footprint. The building model may be measured using a range finding device (e.g., a light detection and ranging (LIDAR) sensor) mounted on a ground vehicle or an aerial vehicle. The building model may be created by measuring the locations of buildings manually. In the three-dimensional example, the building model may include outlines of buildings 131 derived from a point cloud collected by the range finding device. In the two-dimensional example, the building model may include locations of the corners and/or edges of the buildings. The two-dimensional example may be derived by projecting the point cloud onto a plane (e.g., the surface of the earth). The building model may be overlaid on a city map 132 and stored in a map database. The building model includes many irregular shaped urban canyons that wreak havoc on satellite-based positioning systems. FIG. 4 illustrates an example portion of the graphical representation of the building model of FIG. 3. An arrow 135 indicates an urban canyon between the buildings 131. The urban canyon is shaped by a street 133 that runs between the buildings 131.

Figure 5:
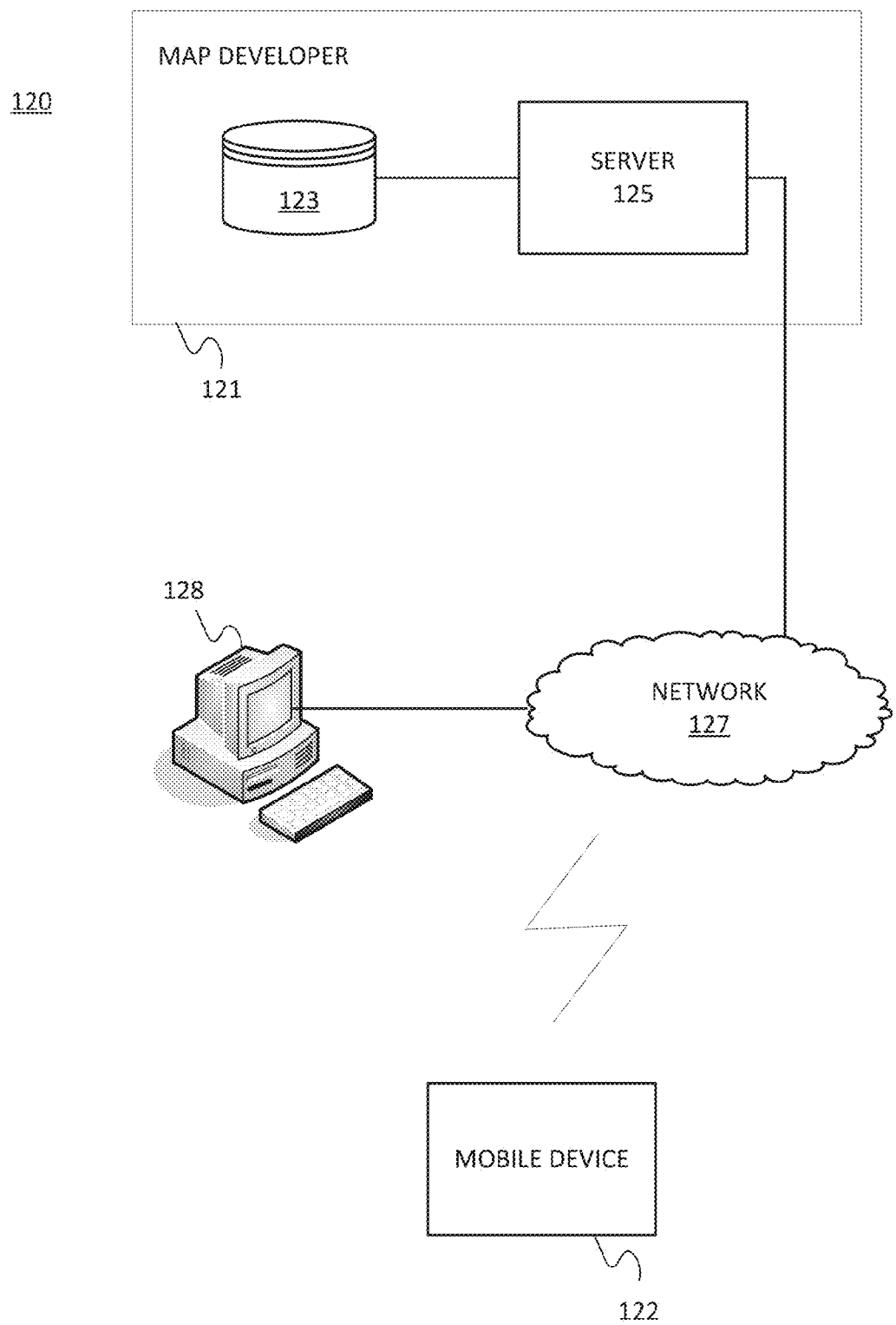
FIG. 5 illustrates an example system for determining position in urban canyons.

FIG. 5 illustrates an exemplary system 120 for calculating position in urban canyons. The system 120 includes a map developer system 121, a mobile device 122, a workstation 128, and a network 127. Additional, different, or fewer components may be provided. For example, many mobile devices 122 and/or workstations 128 connect with the network 127. The developer system 121 includes a server 125 and a database 123. As another example, no mobile devices 122 or no workstations 128 connect with the network 127.

The mobile device 122 may include or be co-located with a range finding sensor and/or a positioning unit. The mobile device 122 may be in communication with the range finding sensor, which is mounted on a vehicle. The positioning unit may integrated with the mobile device 122 and the range finding device is external to the mobile device 122 and in communication with the mobile device 122. In another example, both the range finding device and the positioning unit are integrated with the mobile device 122. The mobile device 122 receives distance data from the range finding sensor. The range finding sensor may be a LIDAR sensor, such as a two-dimensional planer type LIDAR sensor or line sensor. The range finding sensor is configured to send a laser or other signal that reflects off objects in the geographic area around the range finding sensor. Each received signal may correspond to distance data for a distance to an object from a mobile device. The signals may be received from the range finding sensor even if a satellite-based positioning unit is out of range or calculates an inaccurate position.

The received signals are aggregated as a point cloud. Each point in the point cloud includes a three-dimensional location and, optionally, an intensity value. The point cloud may be projected onto a plane such that each point describes a two-dimensional location. The edges or corners of objects such as buildings may be derived from the density of the points in the point clouds, differences in distance of points, and/or intensity of points in the point cloud. The corners of objects may be identified analyzing distance of the sequence of point clouds when a point density in the point cloud exceeds a threshold density.

The building corners are particularly useful for determining the position of the mobile device 122 because they have high detectability. Building corners are accurate because a single point generally represents the building corner. There is not a range of possible locations for the building corner. A building edge, on the other hand, extends along many points. In addition, building corners are detectable because a point cloud may be analyzed to determine where the building corners are. That is, the building corners represent a sharp change in the point cloud because the spaces in between buildings include no points or include large changes in distance. In addition, the building corners are the most efficient way to describe a building model. A building in a two-dimensional building model may be defined by the data points of the building's corners only. The range finding sensor may be located at the same position or substantially the same position as the mobile device 122. Alternatively, the location of the mobile device 122 is known with respect to the range finding sensor and can be used to translate the point cloud to the reference of the mobile device 122. The point cloud may be projected to a plane parallel with the travel of the mobile device and/or the surface of the Earth.

The mobile device 122 is also configured to access a predetermined model to receive a location of the object. The predetermined model includes known locations of objects in a geographic area. The predetermined model may be a point cloud or a building model. The predetermined model may be a two-dimensional model of building footprint outlines or building corners. Each building corner may include a latitude and longitude coordinate pair. The mobile device 122 may receive two corners from different buildings or the same building. The predetermined model may be selected according to an estimated position determined by the satellite-based positioning unit. The estimation may be inaccurate for the position of the mobile device 122 but accurate enough to select the predetermined building model. The predetermined model may be selected according a previous position (e.g., last known position to be accurate) determined by the satellite-based positioning unit.

In one example, building corners may be identified by comparing the distances derived from the relative coordinates of the measured point clouds. The measured distances define a pattern which may be compared with the distances to the building model. For example, a pattern may include four building corners of distances A, B, C, and D of the building corners. This pattern is identified from the distances derived from the computed relative positions of the building corners using the measured distances in the point clouds. For example, there may be only one general location that has building corners A, B, C, and D. The mobile device 122 or the server 125 is configured to calculate a position of the mobile device 122 based on the location of the object and the distance to the object. In the case of two objects, the mobile device receives a coordinate pair for the location of each object from the predetermined building model and a distance to each object is received from the range finding sensor. In the case of one object, coordinate pairs of two or more points on the object may be used. For example, the position of the mobile device 122 may be determined from the two locations of the building corners and the distances to those building corners. Several mathematical or geometrical approaches to solving for the position of the mobile device 122 are possible.

Figure 6:
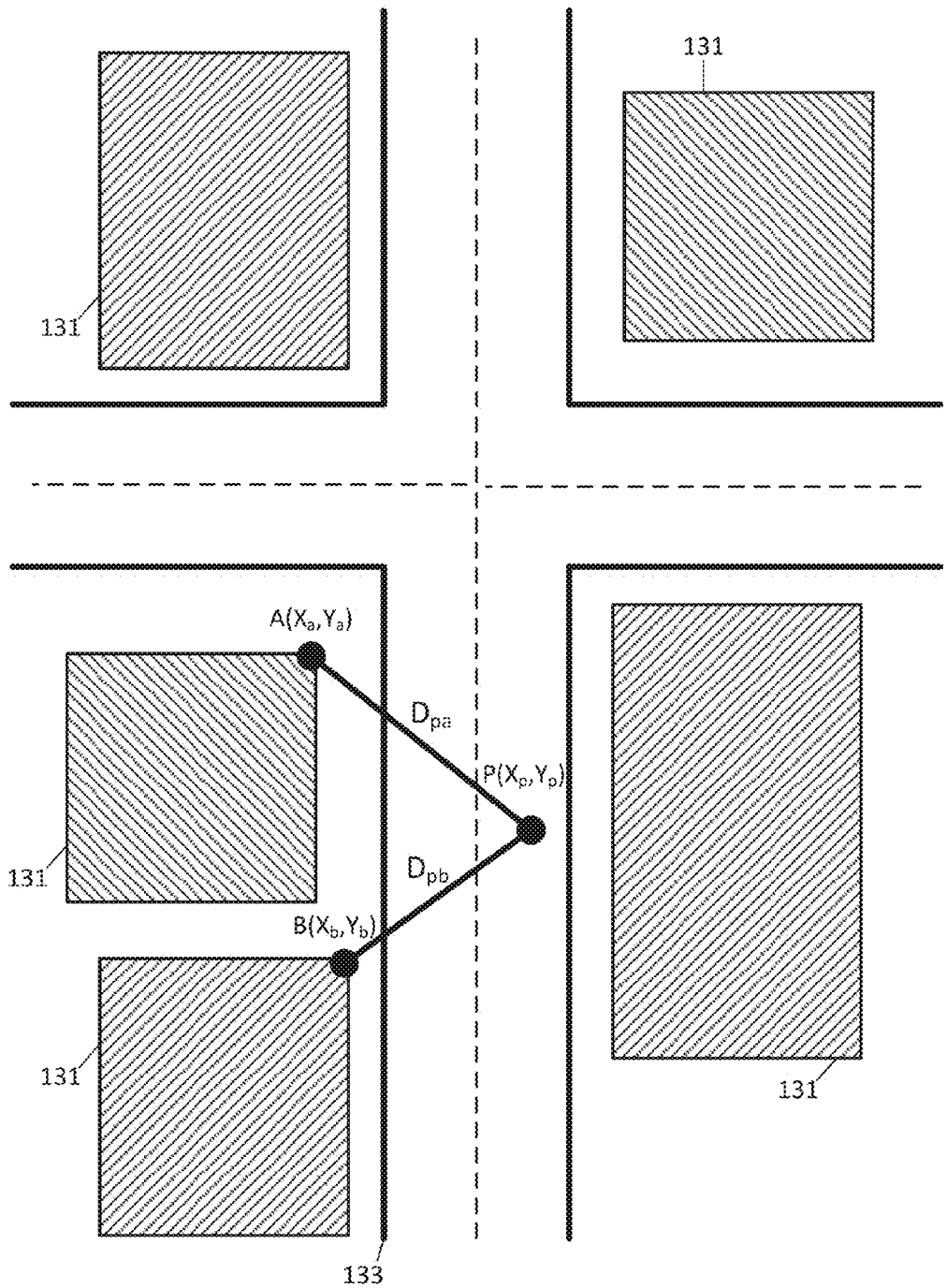
FIG. 6 illustrates an example calculation of a position of a mobile device based on measurement of distance from user position to nearby building.

FIG. 6 illustrates an example algebraic calculation of a position of a mobile device. The example calculation of FIG. 6 involves two building corners, at points A and B. The corners may be on different buildings or the same building and be on different or the same side of the path of mobile device 122 at point P. A first mathematical relationship may be determined between points A and P and another relationship may be determined between points B and P. For example, the distance between points A and P may be described by Equation 1 and the distance between points B and P may be described by Equation 2. The coordinates for point A ($X_A$ and $Y_A$) as well as the coordinates for point B ($X_B$ and $Y_B$) are known from the predetermined model as object locations. The distance from the mobile device 122 to point A, $D_{PA}$, is derived from the data collected from the range finding sensor, and the distance from the mobile device 122 to point B, $D_{PB}$, is derived from the data collected from the range finding sensor. Therefore, the unknowns in Equations 1 and 2 are $X_P$ and $Y_P$, which may be solved algebraically.

$$D_{PA} = \sqrt{(X_A - X_P)^2 - (Y_A - Y_P)^2} \quad \text{Eq. 1}$$

$$D_{PB} = \sqrt{(X_B - X_P)^2 - (Y_A - Y_P)^2} \quad \text{Eq. 2}$$

Figure 7:
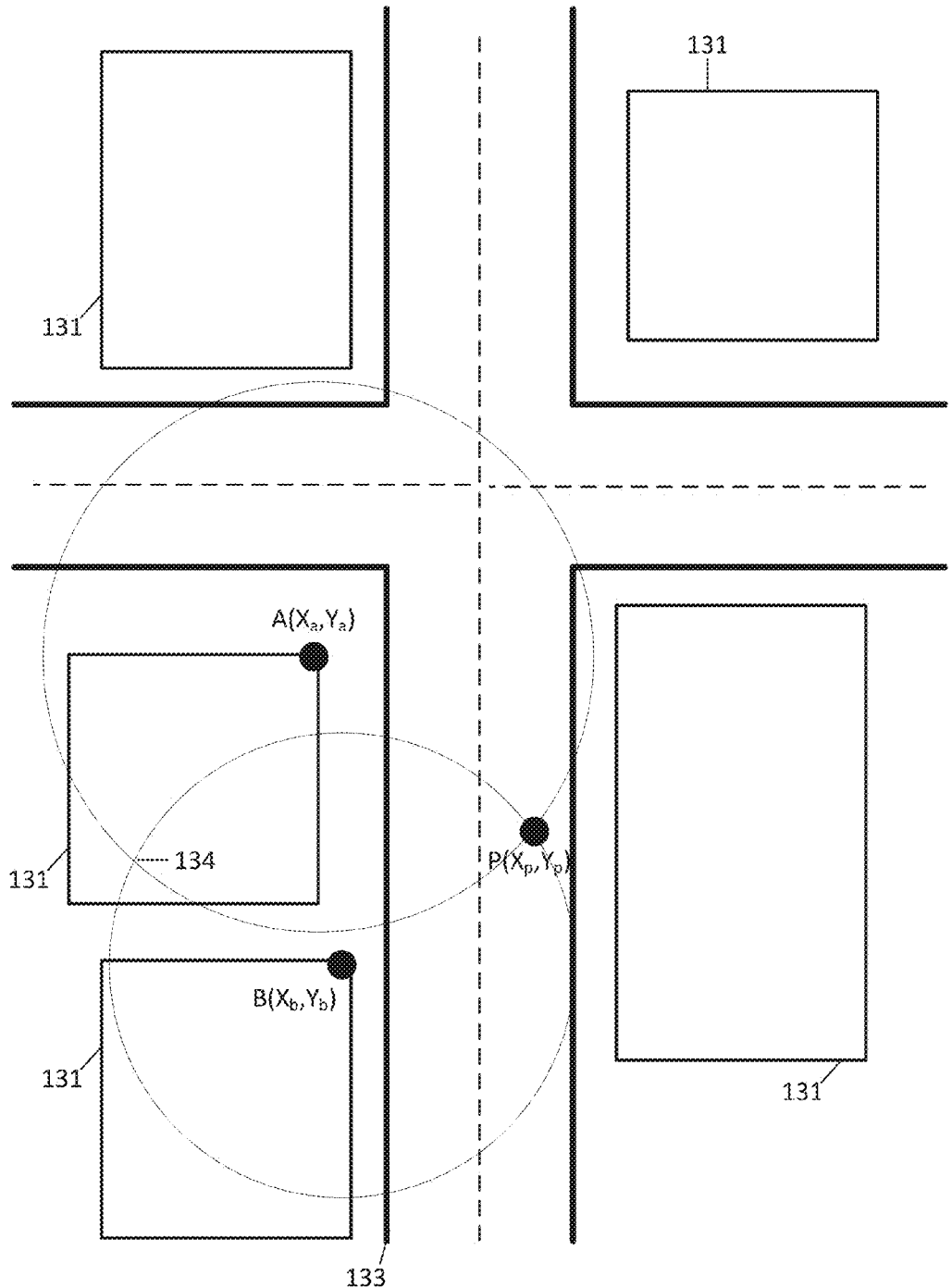
FIG. 7 illustrates another example calculation of a position of a mobile device.

FIG. 7 illustrates an example geometric calculation of a position of the mobile device 122 as performed by the server 125 or locally by the mobile device 122. As in FIG. 6, the position of the mobile device 122 is determined from the coordinates for point A, $X_A$ and $Y_A$, as well as the coordinates for point B, $X_B$ and $Y_B$, that are known from the predetermined model as object locations. The distance from the mobile device to point A and the distance from the mobile device 122 to point B are measured by the range finding sensor. The geometric calculation involves constructing a first circle centered at point A having a radius of the distance from the mobile device 122 to point A and a second circle centered at point B having a radius of the distance from the mobile device 122 to point B. The first circle and the second circle intersect at two points.

The mobile device 122 is configured to select point P as the correct location of the mobile device 122. The erroneous intersection point 134 may be dismissed based on any combination of the following techniques. First, the point 134 may be compared to map data. If the point 134 is located on a building or other location that is not navigable by car and/or foot, the point 134 may be determined erroneous. Second, the points 134 and P may be compared to a recent GPS position. The point that is farther is deemed erroneous and the closer point is considered the position of the mobile device 122.

Third, the points 134 and P may be compared to a map to determine which point is closest to a street. The point that is farther from a street is deemed erroneous and the point closer to a street is considered the position of the mobile device 122. In addition or in the alternative, a third point may be used. The third point is a third corner of a building. A circle is constructed from the third point. The position of the mobile device 122 is based on the intersection or nearest point to an intersection of the first circle, the second circle and the third circle. Any number of points or building corners and circles may be used in calculation of the position of the mobile device 122.

Figure 8:
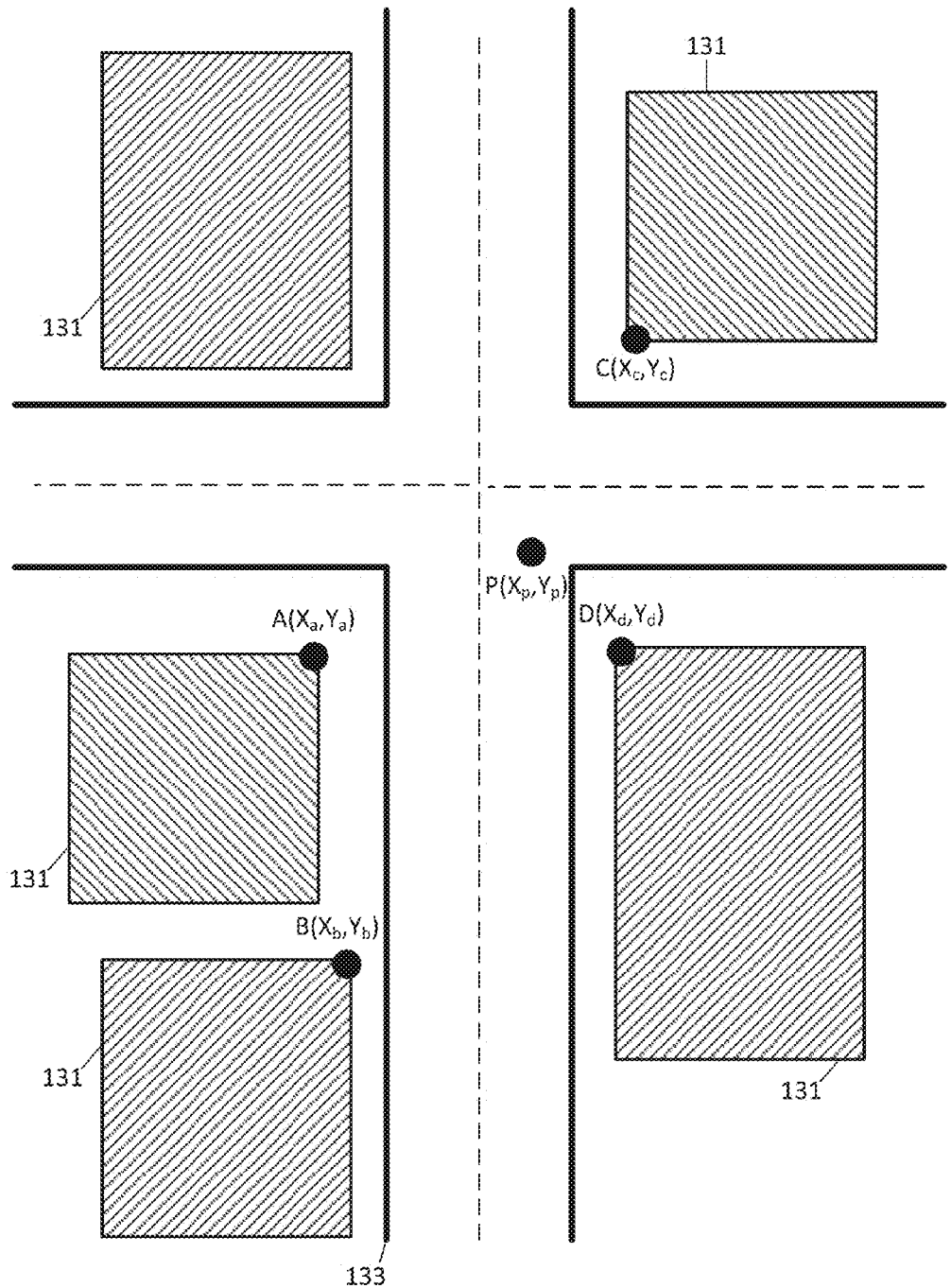
FIG. 8 illustrates yet another example calculation of a position of a mobile device.

FIG. 8 illustrates an example calculation of a position of a mobile device using multiple building corners. The example of FIG. 8 illustrates four building corners A, B, C, and D. Any number of building corners may be used to determine the position of the mobile device. Each additional corner provides an additional equation and accordingly, another level of redundancy for solving the series of equation. Each corner provides an equation similar to Equation 1 or Equation 2. The m identified building corners may provide m equations and 2 unknowns, which provides m−2 levels of redundancy. Each level of redundancy provides additional possible solution to the series of equations and hence contributes to improved quality of the position determined.

Any variety of linear algebra techniques may be used to solve the series of equations. In one example, a least squares technique can be used to get the optimal results from more than two points measurements.

Other techniques for solving for the position of the mobile device 122 may involve the law of cosines and trigonometry. A triangle has two sides corresponding to the distances from two building corners to the position of the mobile device 122, which are measured by the range finding sensor. The third side of the triangle is the distance between the building corners, which is calculated from the building footprints. The law of cosines and trigonometry may be used to calculate the interior angles of the triangle as well as possible positions of the mobile device 122.

In another example, a distance to a single building corner and the angle to that building corner to a reference direction are used to construct a right triangle. The lengths of the sides of the right triangle are calculated from trigonometric functions. The lengths of the sides of the right triangle are used to calculate the position of the mobile device 122 from the known location of the building corner.

The series of equations for calculating the position of the mobile device 122 may also include satellite-based range measurements. Equation 3 includes a relationship between a pseudo-range ($\rho_i$) distance between a position of an $i^{th}$ satellite ($X_i$, $Y_i$, $Z_i$) and the position of the mobile device 122 at the time of measurement ($X_P$, $Y_P$, $Z_P$). The constant c is the speed of light. Equation 3 introduces two other unknowns, the vertical position of the mobile device, $Z_P$, and the satellite-receiver clock error, $t_E$.

$$\rho_i = \sqrt{(X_i - X_P)^2 + (Y_i - Y_P)^2 + (Z_i - Z_P)^2} + ct_E \quad \text{Eq. 3}$$

Each satellite measurement introduces another equation similar to equation 3. There may be an additional equation for each point in time for each satellite in range to the mobile device 122. These additional equations introduce two unknowns, $Z_P$ and $t_E$. Each equation after four provides another level of redundancy for solving the series of GPS equations. All the satellite measurement equations (e.g., like Equation 3) may be solved separately or in combination with the building corner equations (e.g., Equation 1 and 2) in order to calculate the position of the mobile device 122.

Based on the pattern of distances from LIDAR, relative coordinates of the point to which the LIDAR measurements belong can be determined. The set of coordinate points can be compared for pattern with the building pattern computed from building foot print coordinates to identify which LIDAR distance measurement corresponds to which building corner. In one example, the building model is also selected based on a satellite-based measurement. The mobile device 122 or the server 125 may select the building model based on an estimated location of the mobile device 122 from a satellite-based positioning system. For example, the building corners closest to the estimated location of the mobile device 122 may be retrieved from the building model. In another example, building corners may be selected based on the last known or any previous location of the mobile device 122 determined using the satellite-based positioning system.

The mobile device 122 or the server 125 may be able to perform any of the above calculations of the position of the mobile device 122 in all surroundings. In one example, the above calculations of the position of the mobile device 122 may be used any time a building model or other predetermined model is available. In another example, the above calculations are performed only when needed, such as when the mobile device 122 is traveling in an urban canyon.

The mobile device 122 or the server 125 may be configured to determine when the mobile device 122 is in or near an urban canyon. The urban canyons may be known from the map database. In other words, the locations of urban canyon are previously identified and stored in the map database. The mobile device 122 or server 125 accesses the map database to retrieve an indication of an urban canyon. Alternatively, the existence of the urban canyon may be assumed in all downtown areas. That is a predetermined range from each metropolitan center is designated as an urban canyon in the map database.

In another example, the mobile device 122 or the server 125 may automatically detect an urban canyon. For example, the satellite-based location data may be examined for accuracy or multipath errors in order to detect when the mobile device 122 is traveling in an urban canyon. In one example, the mobile device 122 may determine how many satellites are in range. When less than a threshold number of satellites are in range when compared with how many should be above the horizon for the time of the day, the mobile device 122 can detect area of an urban canyon. Example threshold numbers are any integer. Example integers include 2, 3, and 4. In general all location will have 4 or more satellites in view. The number of visible satellites hence the threshold may be defined according to geographic region and a calendar. For example, the orbits of the satellites are known and for any given location at any given time, a minimum number of expected numbers of satellites may also be used as the threshold.

The mobile device 122 is a smart phone, a mobile phone, a personal digital assistant ("PDA"), a tablet computer, a notebook computer, a personal navigation device ("PND"), a portable navigation device, and/or any other known or later developed portable or mobile device. The mobile device 122 includes one or more detectors or sensors as a positioning system built or embedded into or within the interior of the mobile device 122. The mobile device 122 receives location data from the positioning system.

The optional workstation 128 is a general purpose computer including programming specialized for the following embodiments. The workstation 128 includes at least a memory, a processor, and a communication interface. For example, the workstation 128 is a personal computer, terminal, or other stationary computing platform.

The developer system 121 may include computer systems and networks of a system operator (e.g., NAVTEQ or Nokia Corp.). For example, the developer system 121 includes the database 123 and the server 125. Additional or different components may be provided, such as a distributed network of databases and associated servers for regional or redundant operation.

The developer system 121, the workstation 128, and the mobile device 122 are coupled with the network 127. The phrase "coupled with" includes directly connected to or indirectly connected through one or more intermediate components. Such intermediate components may include hardware and/or software-based components. The network 127 is a cellular, local area, wide area, Internet, or other network.

The computing resources necessary for determining the position of the mobile device 122 may be divided between the server 125 and the mobile device 122. In some embodiments, the server 125 performs a majority of the processing ("server-based embodiments"). In other embodiments, the mobile device 122 or the workstation 128 performs a majority of the processing ("endpoint-based embodiments"). In additional embodiments, the processing is divided substantially evenly between the server 125 and the mobile device 122 or workstation 128 ("hybrid embodiments"). Any combination of processing burden between the server 125 and the mobile device 122 or workstation 128 may be used.

Figure 9:
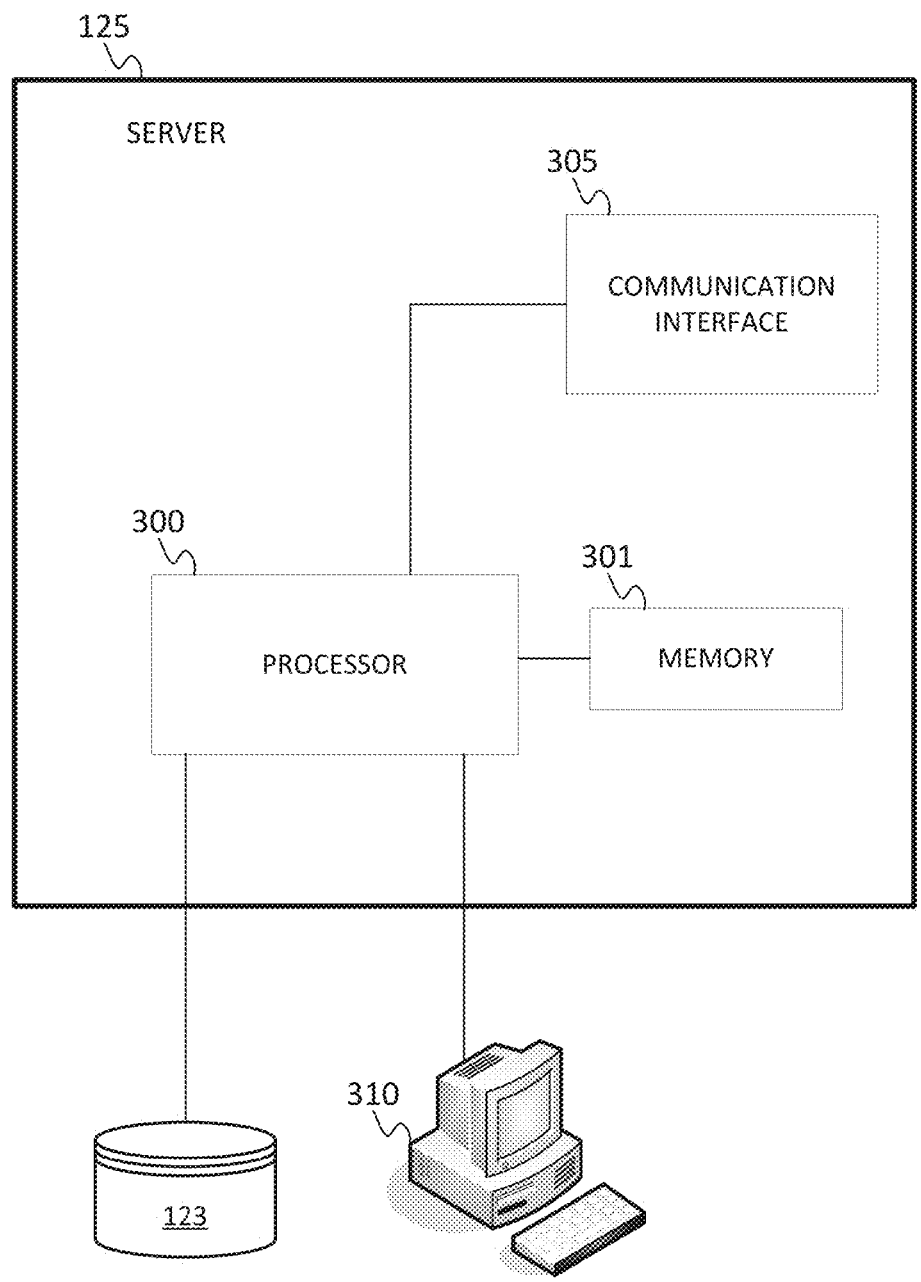
FIG. 9 illustrates an exemplary server of the system of FIG. 5.
Figure 10:
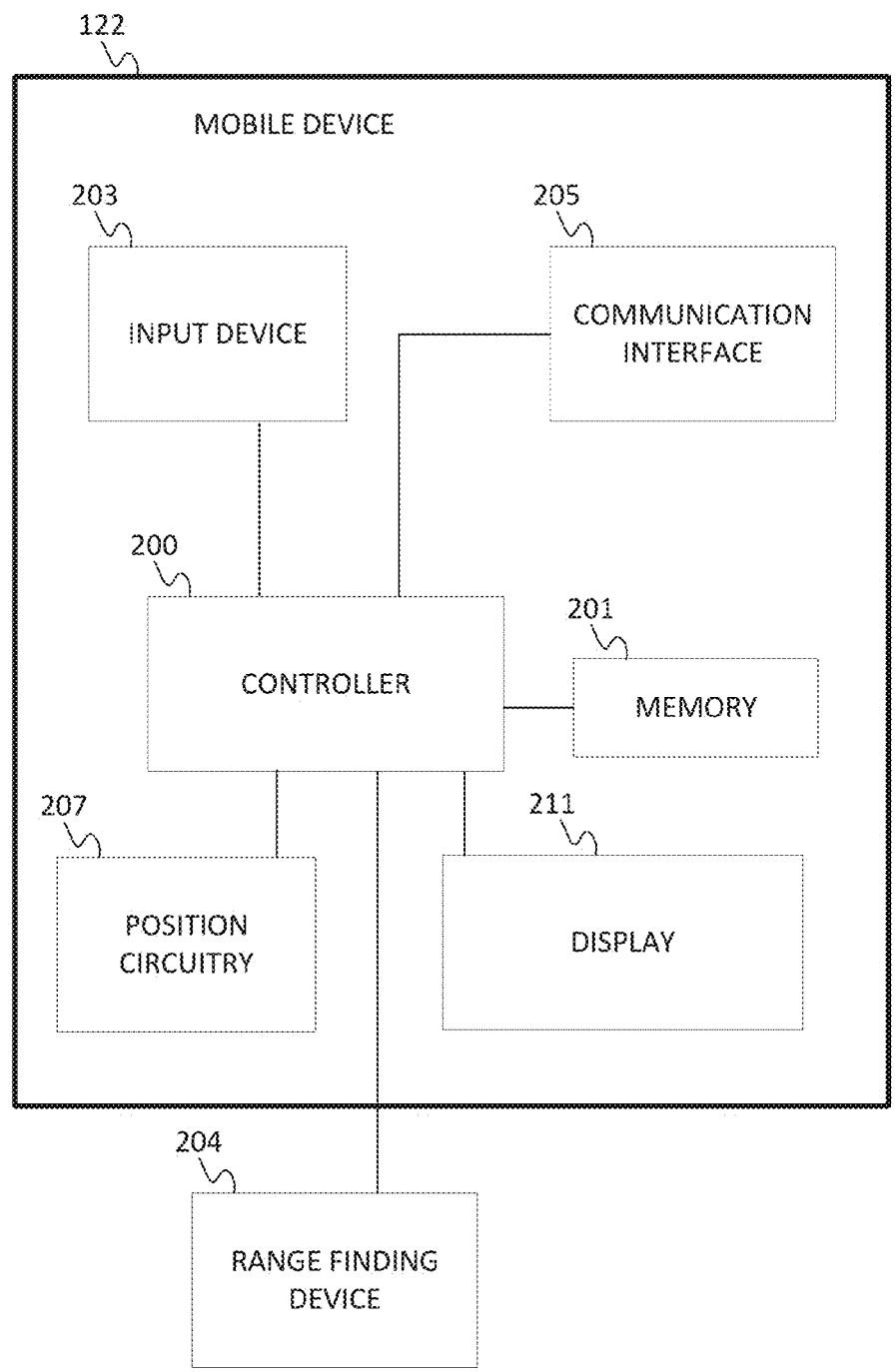
FIG. 10 illustrates an exemplary mobile device of the system of FIG. 5.

FIG. 9 illustrates an exemplary server of the system of FIG. 5. The server 125 is configured to determine the position of the mobile device 122 when the position of the mobile device 122 cannot be accurately determined using satellite-based positioning systems alone. The server 125 includes a processor 300, a communication interface 305, and a memory 301. The server 125 may be coupled to a database 123 and a workstation 310. The workstation 310 may be used as an input device for the server 125. In addition, the communication interface 305 is an input device for the server 125. The communication interface 305 receives data indicative of user inputs made via the workstation 128 or the mobile device 122. FIG. 10 illustrates an exemplary mobile device of the system of FIG. 5. The mobile device 122 may be referred to as a navigation device. The mobile device 122 includes a controller 200, a memory 201, an input device 203, a communication interface 205, position circuitry 207, and a display 211.

The mobile device 122 is coupled to a range finding device 204 that collects and gathers data points in a point cloud. The data points include distance measurements. An intensity value may also be included. The distance value and angle value can be used to signify a location of a point in the point cloud. The point cloud may be stored in ASCII or LIDAR exchange format. One or more lasers of the LiDAR device may be in a near infrared spectrum (such as about 700 nm to about 5000 nm or about 800 nm to about 2500 nm) or another light spectrum. The range finding device 204 may include a planer type sensor or a line scanner. The range finding device 204 may include multiple sensors, which are position in a relationship with the mobile device 122 and at a specific height from the ground.

The memory 201 or memory 203 is configured to store a predetermined model of objects and expected coordinates of the objects. The predetermined model may include coordinate pairs such as longitude and longitude of the objects. The objects may include buildings. The expected coordinates may be building corners.

The range finding device 204 is configured to detect distances to the objects near the mobile device 122. The range finding device 204 may detect distances to all objects possible. Alternatively, the range finding device 204 may be controller to detect distances to specific objects. The specific objects may be identified from the predetermined model.

The controller 200 or processor 300 is configured to calculate a current position of the mobile device 122 based on the distance to the object and expected coordinates of the object. Any number of points on objects may be used. The number of points dictates the number of unique equations for the position of the mobile device. The series of unique equations may be solved using algebra or geometry as described above. The series of unique equations may be combined with additional position equations based on the one or more pseudo-range measurements of GPS satellites.

Figure 11:
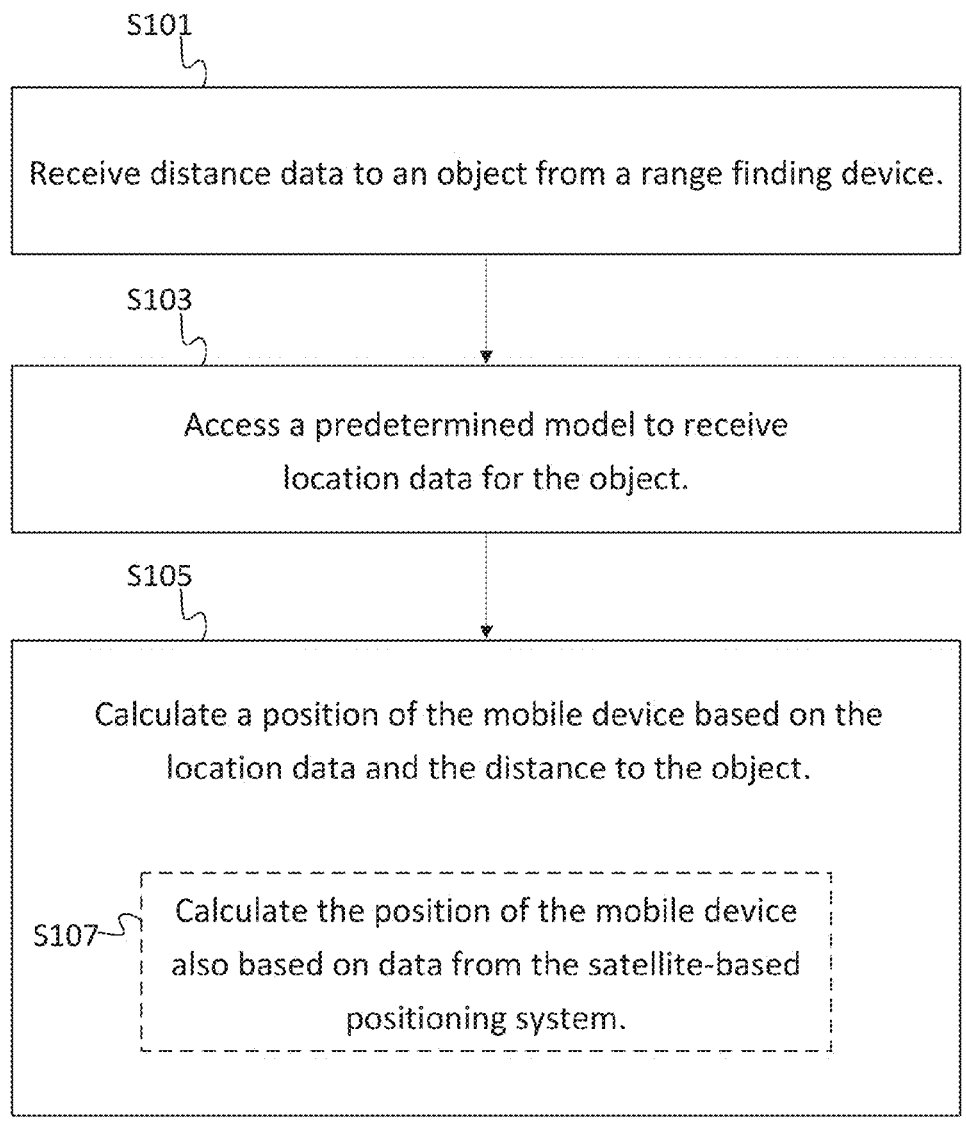
FIG. 11 illustrates another example flowchart for determining position in urban canyons.

FIG. 11 illustrates an example flowchart for detecting position in urban canyons, which is described in relation to the server 125 but may be performed by another device, such as the mobile device 122. Additional, different, or fewer acts may be provided.

At act S101, the processor 300 receives distance data describing the current distance to an object. The distance data is generated by the range finding device 204. The data may be received directly from the range finding device 204, from the mobile device 122, or from memory 301. The distance data may be filtered to select points that are reliably indicative of building corners. The filter may identify a cluster of points and average or smooth the cluster of points.

At act S103, the processor 300 accesses a model to receive previous location data for the object. The model may also be created from a range finding device, but at a time prior to act S101. The building model may be a combination of LIDAR data taken from the ground by automobile and from the sky by helicopter or airplane. Alternatively, the building model may be created using surveying data, derived from images, or manually measured distances.

At act S105, the processor 300 calculates the position of the mobile device 122 based on the previous location data and the current distance to the object. In one example, the processor 300 determines the position of the mobile device based on a distance and an angle to an object with a known position using trigonometric identities. In another example, the processor 300 solves a series of equations. Each equation in the series of equations is derived from a different object or different edge or corner of an object. As more objects, edges, or corners are used, more equations can be combined, the level of redundancy is increased. Higher redundancy means greater accuracy for the solution. Multiple solutions may be calculated from the series of equations. The least squares technique may be used to select a solution. Alternatively, the multiple solutions may be averaged or filtered to determine a best solution for the position of the mobile device 122.

At S107, the processor 300 may also calculate the position of the mobile device also based on data from the satellite-based positioning system. That is, the series of equations in S105 may be supplemented with equations based on one or more pseudo-range measurements of GPS satellites.

The processor 300 may also be configured to estimate the position of the mobile device 122 using satellite-based positioning calculations. The estimated position of the mobile device 122 may be used to select the building model or identify objects in the building model. The estimated position of the mobile device 122 may be used to eliminate outlier or erroneous solutions to the series of equations. The equations from the satellite-based positioning calculations may be combined with the series of equations to provide additional levels of redundancy for more accurate results from the solution.

The input device 203 may be configured to receive an indication from the user or calculation that the mobile device 122 is in an occluded area and an urban canyon mode should be selected to perform the calculations discussed above. The input device 203 may be configured to receive a number of visible satellites for the threshold to perform the urban canyon calculations. The input device 203 may be configured to receive data indicative of the building model selected (e.g., the user may identify a current intersection of the mobile device 122).

The input device 203 may also have one or more buttons, keypad, keyboard, mouse, stylist pen, trackball, rocker switch, touch pad, voice recognition circuit, or other device or component for any manual inputting data to the mobile device 122. The input device 203 and the display 211 may be combined as a touch screen, which may be capacitive or resistive. The display 211 may be a liquid crystal display (LCD) panel, light emitting diode (LED) screen, thin film transistor screen, or another type of display.

The positioning circuitry 207 may include a Global Positioning System (GPS), Global Navigation Satellite System (GLONASS), or similar position sensor for providing location data. The positioning system may also utilize a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of speed and/or rotational movement of the mobile device 122. The mobile device 122 receives location data from the positioning system.

The database 123 of the system 120 may be a geographic database. The geographic database 123 includes information about one or more geographic regions. Each road in the geographic region is composed of one or more road segments. A road segment represents a portion of the road. Each road segment is associated with two nodes (e.g., one node represents the point at one end of the road segment and the other node represents the point at the other end of the road segment). The node at either end of a road segment may correspond to a location at which the road meets another road, i.e., an intersection, or where the road dead-ends. The road segment data record may include data that indicate a speed limit or speed category (i.e., the maximum permitted vehicular speed of travel) on the represented road segment. The road segment data record may also include data that indicate a classification, such as a rank of a road segment that may correspond to its functional class. The road segment data may include data identifying what turn restrictions exist at each of the nodes which correspond to intersections at the ends of the road portion represented by the road segment, the name or names by which the represented road segment is known, the length of the road segment, the grade of the road segment, the street address ranges along the represented road segment, the permitted direction of vehicular travel on the represented road segment, whether the represented road segment is part of a controlled access road (such as an expressway), a ramp to a controlled access road, a bridge, a tunnel, a toll road, a ferry, and so on.

End users may access a route from an origin to a destination. A route calculation application determines the route for the end user to travel along the road segments to reach the desired destination. In order to calculate a route, the route calculation application is provided with data identifying a starting location (origin) and a desired destination location. In one embodiment, the starting location may be the end user's current position and the destination may be entered by the end user. Given at least the identification of the starting location (origin) and the desired destination location, the route calculation application determines one or more solution routes between the starting location and the destination location. A solution route is formed of a series of connected road segments over which the end user can travel from the starting location to the destination location. When the route calculation application calculates a route, the application accesses the geographic database 123 and obtains data that represent road segments around and between the starting location and the destination location. The road calculation application uses the data to determine at least one valid solution route from the starting location to the destination location. The at least one valid solution route may be displayed to the user in the rendering of the geographic region.

In one embodiment, the route calculation application may attempt to find a solution route that takes the least time to travel. The segment cost or travel time for the particular represented road segment considers the type of road, such as freeway or residential street, speed limit and distance of the segment. In one embodiment, the route calculation application may consider traffic conditions to more accurately reflect actual travel time over the connected road segments. When the route calculation application determines one or more solution routes comprising the series of connected road segments, the travel times for each of the included connected road segments is summed to provide an estimated route travel time. Based on the route travel time, the route calculation application selects the quickest route. Once the route calculation application has selected the route, the route calculation application provides an output in the form of an ordered list identifying a plurality of road segments that form the continuous navigable route between the origin and the destination. In addition, the route calculation program provides an output of an estimated route travel time.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 201 and/or memory 301 may be a volatile memory or a non-volatile memory. The memory 201 and/or memory 301 may include one or more of a read only memory (ROM), random access memory (RAM), a flash memory, an electronic erasable program read only memory (EEPROM), or other type of memory. The memory 201 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
receiving a pseudo-range measurement of a global positioning system satellite (GPS);
receiving, when the pseudo-range measurement of the GPS is inaccurate, distance data from a range finding sensor, wherein the distance data corresponds to a first current distance to a first point from a mobile device and a second current distance to a second point from the mobile device;
accessing a predetermined building model to receive location data for the first point and the second point, wherein accessing the predetermined building model comprises selecting the predetermined model based on a previous location of the mobile device determined using the GPS;
calculating a current position of the mobile device based on the pseudo-range measurement of the GPS satellite, the location data, the first current distance to the first point and the second current distance to the second point using a simultaneous solution of a plurality of equations including at least one equation for the first current distance, at least one equation for the second current distance, and at least one equation for the pseudo-range measurement; and
displaying a route based on the current position of the mobile device,
wherein the first point and the second point are derived from densities of point cloud data in point clouds, the point cloud data received from the range finding sensor.

2. The method of claim 1, the method further comprising:
accessing the predetermined building model to receive a location of a third point, wherein the distance data from the range finding sensor includes a distance to the third point from the mobile device;
wherein calculating the current position of the mobile device is also based on the location of the third point and the distance to the third point from the mobile device.

3. The method of claim 1, wherein the first point and the second point are building corners.

4. The method of claim 1, wherein the range finding sensor is a planar light distance and ranging (LIDAR) sensor.

5. The method of claim 1, wherein the first point and the second point are identified by aggregating point cloud data received from the range finding sensor.

6. A method comprising:
storing, by a memory, a predetermined building model of buildings and expected coordinates of the buildings;
calculating, by a controller, a current position based on a current pseudo-range measurement of a global positioning system (GPS) satellite, a current measured distance and angle to a building and expected coordinates of the building, wherein the current pseudo-range measurement is received from a GPS device, the current measured distance to the building is received from a range finding device and the expected coordinates of the building are accessed from the predetermined building model based on a last known location determined using the GPS, wherein calculating the current position is based on a simultaneous solution of a plurality of equations including at least one equation for the current pseudo-range of the GPS; and
displaying, by a display, a route based on the current position of the mobile device,
wherein the current measured distance to the building is derived from densities of point cloud data in point clouds, the point cloud data received from the range finding device.

7. The method of claim 6, wherein the estimated location from the satellite-based positioning system comprises detected multipath errors.

8. The method of claim 6, further comprising:
accessing, by the controller, the predetermined building model to receive a location of a second building; and
calculating the position of the apparatus based on the location of the second building and a current distance to the second building.

9. The method of claim 6, wherein the expected coordinates of the building comprise expected coordinates to a corner of the building.

10. The method of claim 6, wherein the current measured distance to the building is identified by aggregating point cloud data received from the range finding device.

11. A non-transitory computer readable medium including instructions that, when executed by a processor, are operable to:
- receive a satellite-based range measurement;
- determine, from the satellite-based range measurement, that a mobile device is in or near an urban canyon;
- receive, in response to determining that the mobile device is in or near an urban canyon, distance data from an optical sensor, wherein the distance data corresponds to distances to a plurality of building corners from a mobile device;
- access predetermined location data for the plurality of building corners from a predetermined building model, the predetermined building model selected based on the received satellite-based range measurement;
- calculate a position of the mobile device based on the predetermined location data and the distances to at least three of the plurality of building corners, each of the plurality of building corners identified by aggregating point cloud data received from the optical sensor, wherein the distances to the plurality of building corners are derived from densities of the aggregated point cloud data in point clouds; and
- display, on the mobile device, a route based on the position of the mobile device.

* * * * *